July 14, 1953 G. L. TURNER ET AL 2,645,296
COMBINATION STEERING, CLUTCH, AND THROTTLE CONTROL
Filed Sept. 16, 1949 16 Sheets-Sheet 1

INVENTOR.
GEORGE L. TURNER
ROBERT LAPSLEY
BY
ATTY.

July 14, 1953 G. L. TURNER ET AL 2,645,296
COMBINATION STEERING, CLUTCH, AND THROTTLE CONTROL
Filed Sept. 16, 1949 16 Sheets-Sheet 6

INVENTOR.
GEORGE L. TURNER
ROBERT LAPSLEY
BY
ATTY.

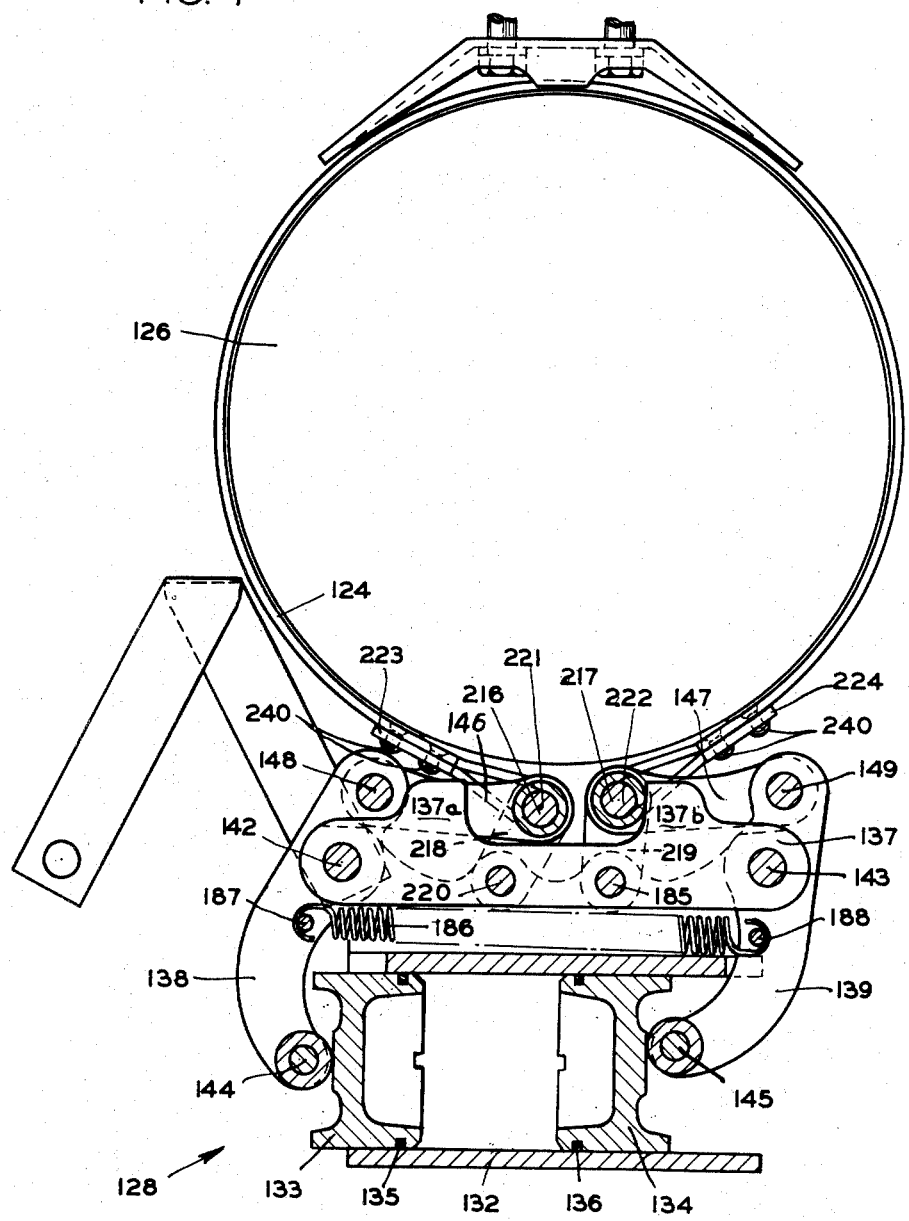

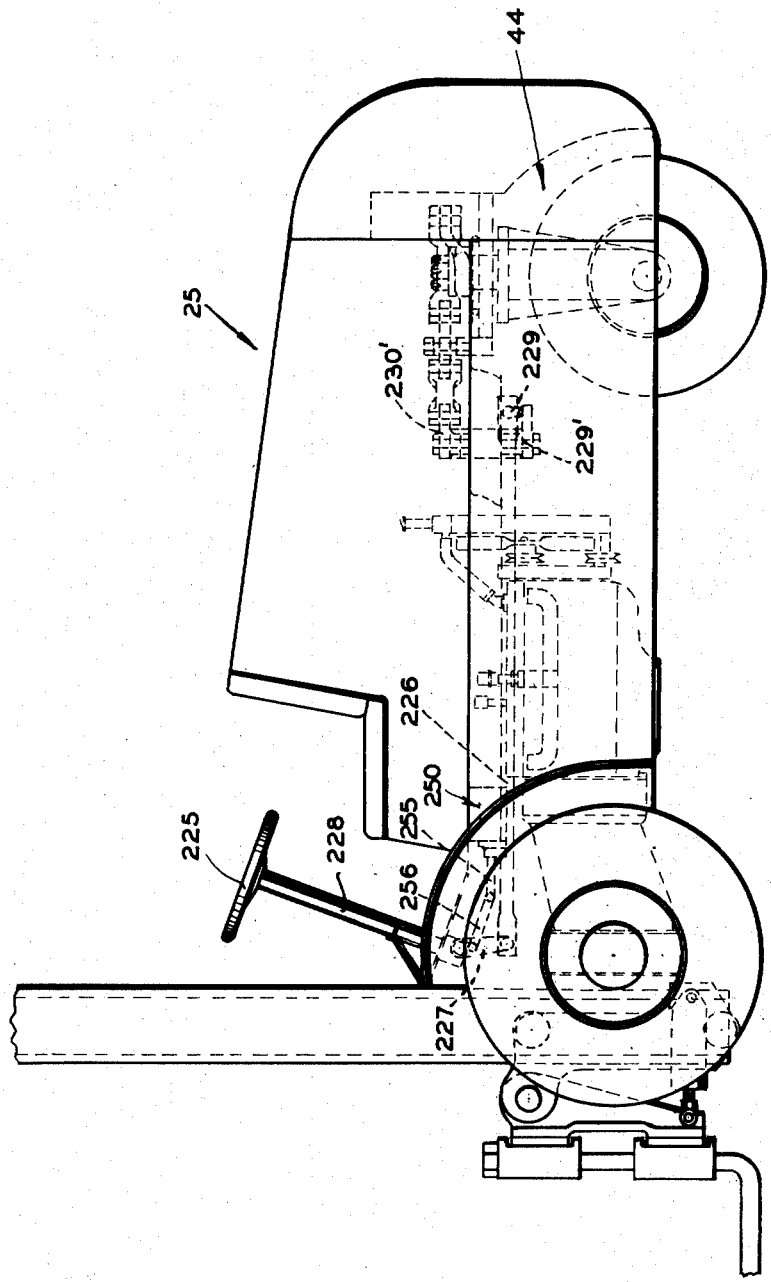

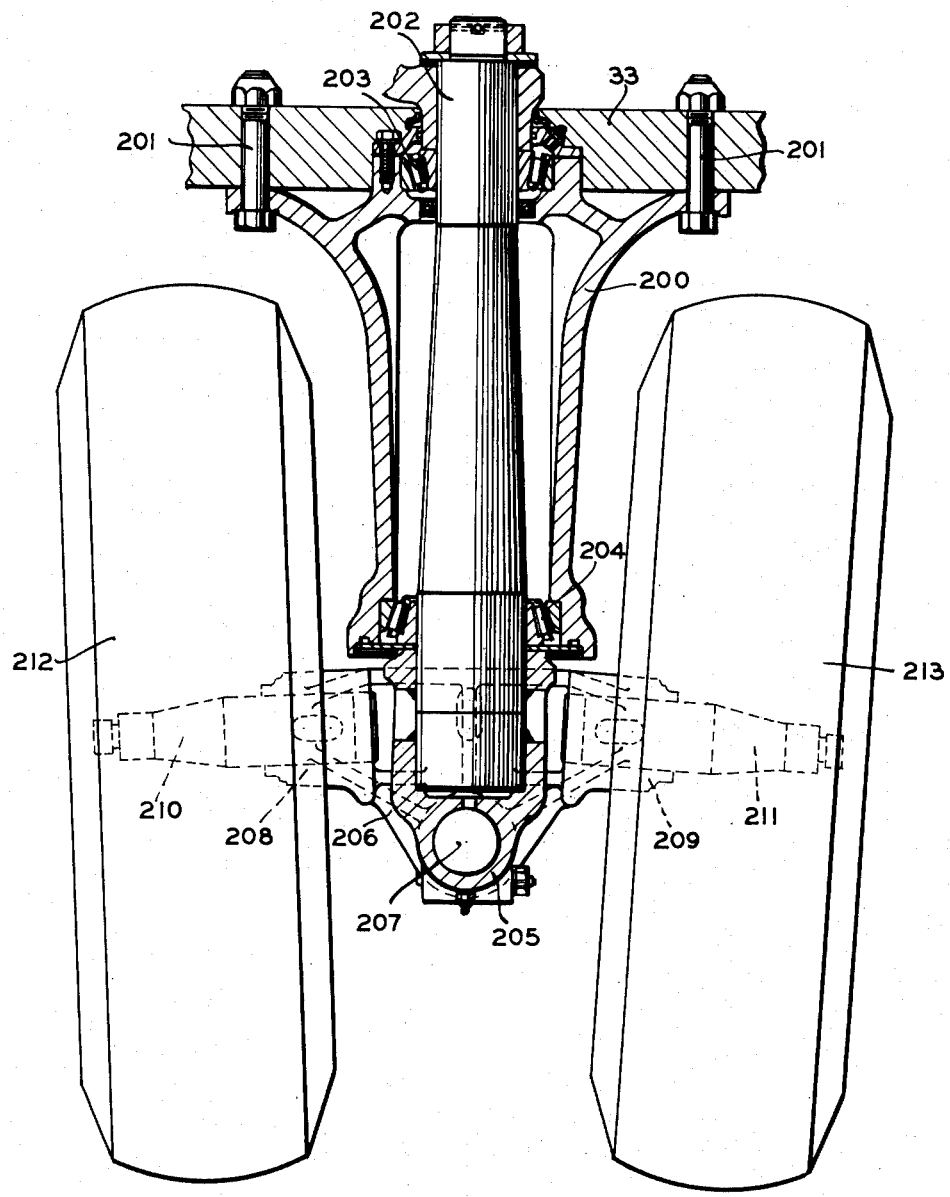

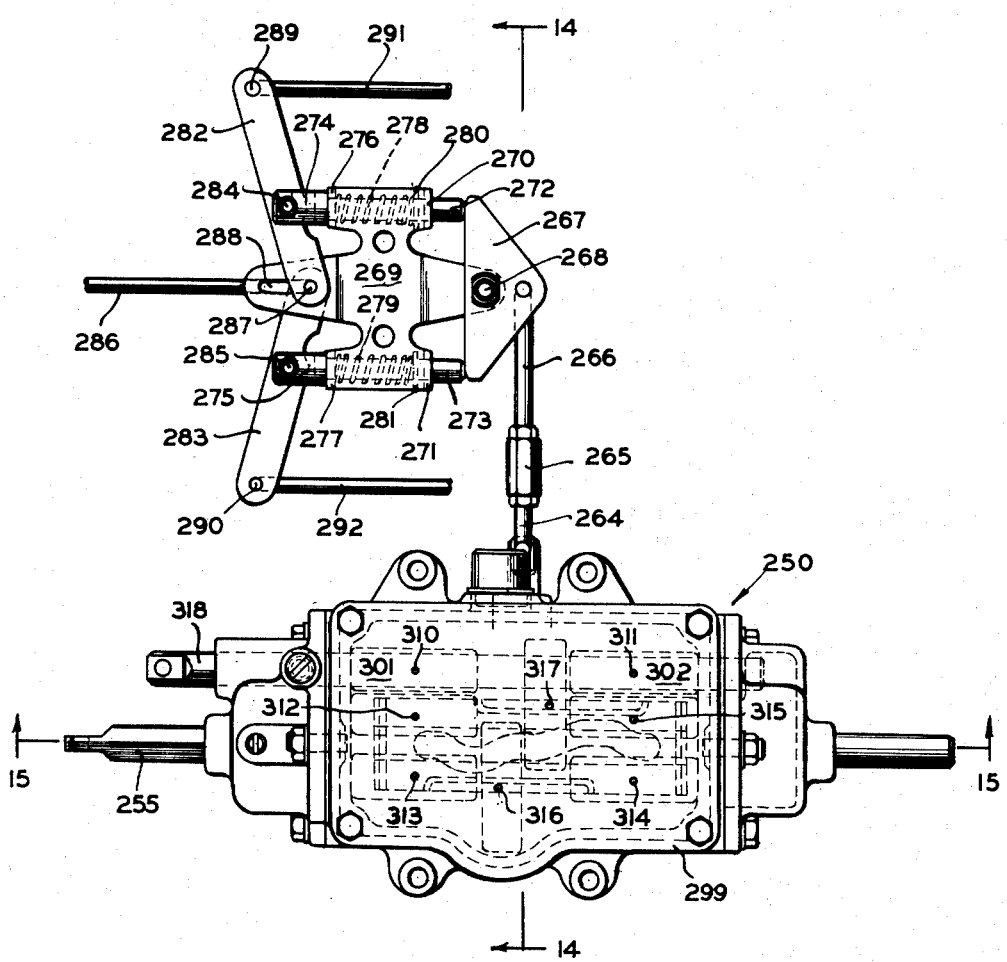
FIG. 12
FIG. 13
INVENTOR.
GEORGE L. TURNER
ROBERT LAPSLEY
BY
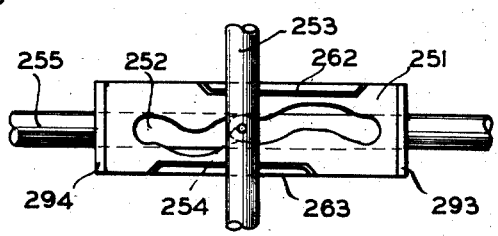
ATTY.

INVENTOR.
GEORGE L. TURNER
ROBERT LAPSLEY
BY
ATTY.

FIG. 18

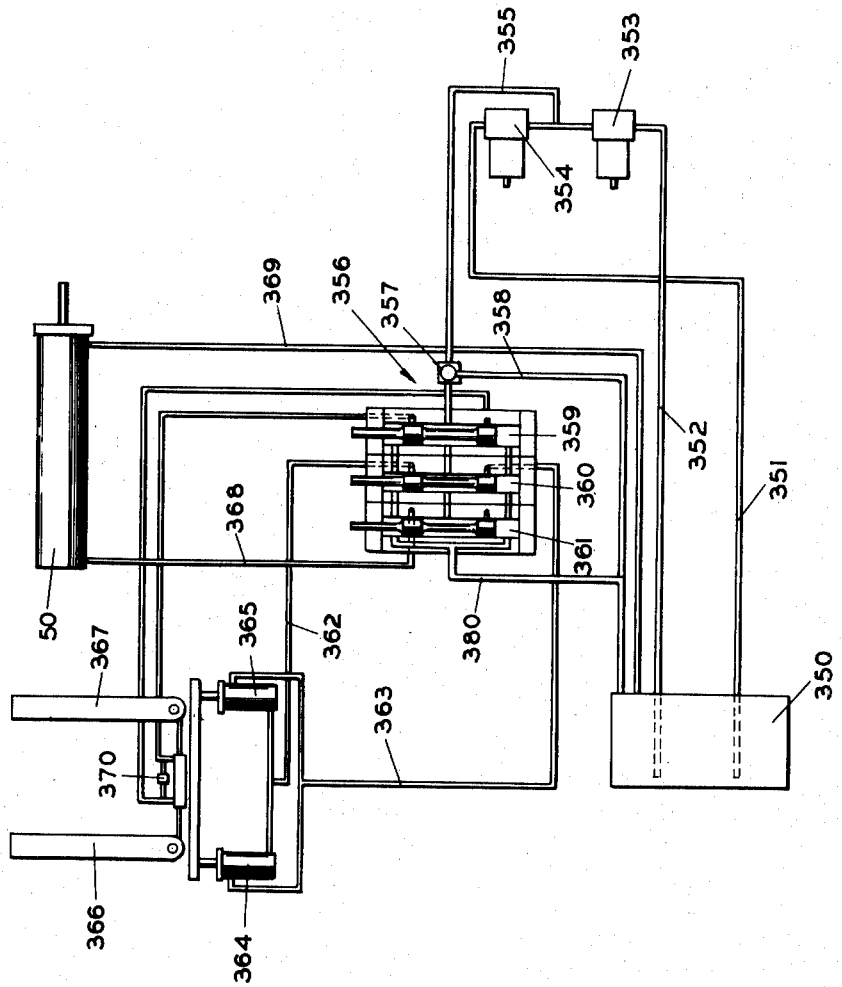

Patented July 14, 1953

2,645,296

UNITED STATES PATENT OFFICE 2,645,296

COMBINATION STEERING, CLUTCH, AND THROTTLE CONTROL

George L. Turner and Robert Lapsley, Buchanan, Mich., assignors to Clark Equipment Company, Buchanan, Mich., a corporation of Michigan Application September 16, 1949, Serial No. 115,982

10 Claims. (Cl. 180—6.34)

Our invention relates to industrial lift trucks and is more particularly directed to an industrial lift truck adapted for lifting, transporting, stacking and depositing relatively heavy loads.

Heretofore, it has been difficult to provide a conventional form of industrial lift truck which would handle relatively heavy loads and still maintain good maneuverability over a wide range of operating conditions.

It is an object of our present invention to provide an industrial lift truck having a pair of forward driving wheels with two individual prime movers or power plants, which may, for example, be internal combustion engines, of which one each is connected by suitable drive means to one each of the forward driving wheels. By providing each forward wheel with its own individual drive, the truck is capable of pivoting about a point located between the drive wheels when the wheels are driven in opposite directions with respect to each other. The truck may thus be easily maneuvered in confined areas.

It is another object of our present invention to provide each of the drive means of the aforementioned prime movers with clutch means, which means comprises a pair of clutches, one for effecting forward drive and the other for effecting reverse drive of the drive wheels.

The prime movers may be connected through the drive means to the forward wheels for forward rotation of the same by actuating the forward drive clutches, and the prime movers may be connected to the forward wheels for reverse rotation of the same by actuating the reverse drive clutches.

It is a further object of our present invention to provide a multi-speed planetary transmission for each of the aforementioned prime movers for effecting selectively substantially the same speeds in both forward and reverse drives to each drive wheel.

It is a still further object of our invention to provide a control system for independently and automatically regulating the speed of each prime mover and for governing the direction of the drive to each forward wheel in response to rotary movement of the steering wheel.

We propose the accomplish the last aforesaid object by providing the steering wheel with a draw rod that is adapted to be moved rectilinearly in response to rotary movement of the steering wheel. Mounted at the end of the draw rod is a cam with which a follower is associated.

In the preferred embodiment of our invention, each prime mover or power plant comprises an internal combustion engine which is controlled by a throttle. The cam follower has connection to the throttles of each engine. The control system is arranged between the steering wheel and the throttle of each engine in a manner which permits the throttles to open and close in unison when the throttle pedal of the truck is actuated and the truck is following a substantially straight line in either a forward or backward direction, and which, if the throttle pedal of the truck is kept constant, will, when turning of the truck is initiated to the right, cause the throttle of the engine adjacent the right side of the truck to be reduced, and when turning of the truck is initiated to the left, cause the throttle of the engine adjacent the left side of the truck to be reduced. By virtue of this arrangement, the engines are utilized during a steering maneuver for reducing the effort that must be exerted by the driver in turning the truck.

As the turning radius to the right is decreased, the throttle is reduced until the idle throttle condition of the engine is reached, at which time the aforementioned cam actuates a switch connected to the forward drive clutch of the right engine for electrically deenergizing the same. If the turning radius is still further reduced the cam is adapted to actuate a switch connected to the reverse drive clutch of the right engine for energizing the same. As the right drive wheel begins to rotate in reverse, the cam, by means of the follower, actuates the throttle for the right engine increasing it from idle to full throttle position. Both wheels are thus rotated under full throttle conditions in opposite directions which effects rotation of the truck about a point midway between the drive wheels.

When it is desired to back the truck up following a path similar to that followed while driving the truck forward a remote control provided for the operator need only be shifted from its forward position to its reverse position, at which time the control system will perform the sequence of operations, as outlined above in reverse.

A still further object of our invention is to provide a rear support means for the truck comprising a pair of wheels one each disposed adjacent each side of a vertically extending rotatable shaft and rotatably mounted one each to each end of a supporting frame disposed adjacent the lower end of the shaft, which supporting frame is mounted for limited rotation about a horizontal axis extending transversely of and below the axes of the wheels.

A still further object of our invention is to provide a steering mechanism for effecting rotative movement of the steering wheel, for the operator, into rotative movement, of at least 180°, of the rear wheels of the truck by means of a substantially rectilinearly movable member connected between the steering wheel disposed at the forward end of the truck and the rear wheels of the truck.

Now in order to acquaint those skilled in the art with the manner of constructing and using industrial trucks embodying the principles of our present invention, we shall describe in connection with the accompanying drawings, a preferred embodiment of our invention.

In the drawings:

Figure 7 is a sectional view of one of the brake means of Figure 6 taken substantially along a vertical plane extending transversely of the axes of the input and output shafts of the transmission;

Figure 10 is a side elevational view of the truck shown in Figure 1;

Figure 11 is a vertical sectional view with certain parts shown in elevation, of the rear steering wheel assembly taken substantially along a vertical plane passing through the axis of the rotatable steering shaft;

Figure 12 is a plan view of an automatic control means embodied in the truck of Figure 1;

Figure 13 is a plan view of the cam and follower which form part of the control means of Figure 12;

Figure 18 is a chart showing the relationship between the forward and reverse drive electric clutches, the throttles of each engine, and the switches of the control means corresponding to various selected driving conditions; and Figure 19 is a diagrammatic view of the hydraulic control system embodied in the truck of Figure 1.

*General arrangement of truck*

Figure 1:
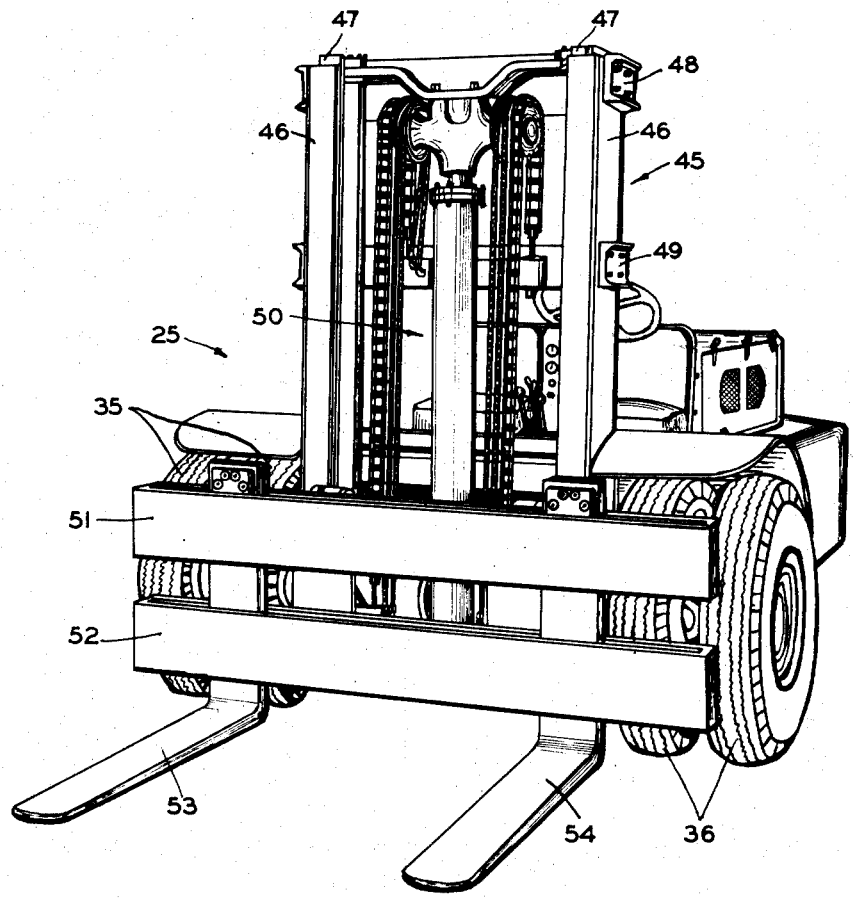
Figure 1 is a front perspective view of an industrial truck constructed in accordance with our present invention.
Figure 2:
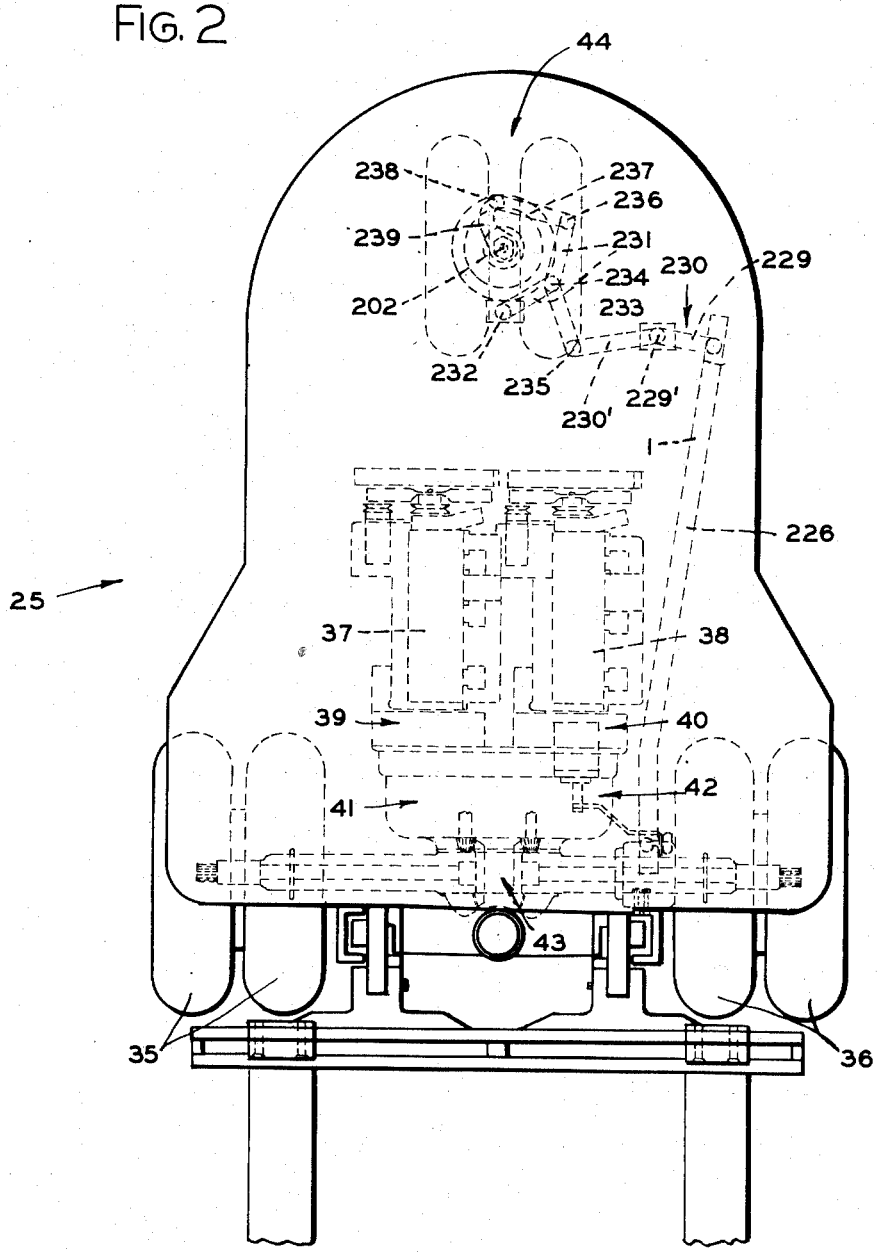
Figure 2 is a plan view, largely diagrammatic, of the truck shown in Figure 1, illustrating the general organization and arrangement of the prime movers and steering mechanism.

Referring now to Figures 1 and 2 there is shown an industrial truck indicated generally by the reference numeral 25. As previously indicated the truck primarily is adapted for handling heavy loads of the order of 15,000 lbs. The truck comprises a main frame 26, shown in detail in Figure 3, having a pair of spaced apart lengthwise extending main side frame members 27 and 28 at the forward ends of which, cap members 27' and 28' are secured and which cap members and forward ends of the frames are formed to define openings for receiving the axle housing arms of a drive axle assembly to be described. The frame 26 further comprises a forward transverse platform frame member 31 having a recess 32 formed therein providing for the support of the cylinder of the hydraulic cylinder and piston assembly 50, and a rear transverse frame member 33 having an aperture 34 formed therein in which a steering shaft 202, shown in Figure 11, is adapted to be journalled. The frame further comprises a pair of upper parallel channels 12—12 extending between the end frame 33 and an intermediate transverse channel 13 supported by post channel members 14—14. The area defined by the channels last described provides for the mounting of the prime movers of the truck to be described. A second pair of spaced lengthwise extending channel frame members 16 lie laterally outwardly of the frame members 27 and 28 and are connected at their forward ends to the latter by the channels 17—17. The frame is completed by a transverse channel 18 to which the rear ends of the side frames 27 and 28 are secured as by welding, and the ends of channel 18 in turn, are secured as by welding, to the channels 16. The frame is enclosed by suitable panel members preferably of rather heavy gauge to add weight to the truck to counterbalance a load adapted to be supported forwardly of the truck. As shown in Figure 1, the driver's seat and controls for the truck are positioned forwardly of the engine compartment.

Referring again to Figures 1 and 2, the industrial truck 25, as shown, is provided with a pair of dual forward drive wheels 35—35 and 36—36 which are adapted to be driven by a pair of prime movers 37 and 38, which in the present embodiment are internal combustion engines. The engines are provided with a conventional ignition system, starting motors, cooling means, fuel supply means, and the other ancillary known devices for effecting their operation. Interposed between the prime movers 37 and 38 and their associated dual drive wheels 35—35 and 36—36 are a pair of clutch means indicated generally at 39 and 40 for providing forward and reverse drives, a pair of transmissions enclosed with a unitary housing and indicated generally at 41 and 42 for providing a plurality of substantially equal forward and reverse speed ratios to the drive wheels, and dual axle drive means indicated generally at 43. The construction of the above several elements of truck 25 will be described in detail hereinafter.

The truck 25 is further provided adjacent its rear end with a steering wheel assembly indicated generally at 44, and adjacent its forward end is provided with a vertically extending mast indicated at 45 comprising pairs of spaced apart channel members 46—46 and in which second channels 47—47 are telescopically arranged. The members 46—46 are interconnected by a pair of U-shaped braces 48 and 49. The channel members are adapted to be moved vertically by means of a hydraulic piston and cylinder assembly 50 which is centered between the channel members 47—47. Mounted adjacent the front of the truck to the members 47—47 there is shown a load supporting carriage which is fully described in the copending application of George L. Turner, one of the present joint inventors, Serial No. 115,397, filed September 13, 1949, now Patent No. 2,608,315, granted August 25, 1952. Secured to the front of the load supporting carriage are a pair of box-like frame members 51 and 52 which extend transversely forwardly of the truck. A pair of forks 53 and 54 are provided adjacent the forward end of the truck and are loosely supported by the upper box-like frame member 51. For purposes of our present invention the mast and load supporting carriage may be of any of the presently known conventional types. Since our present invention is not concerned per se with such structures, it is believed a further description thereof is unnecessary for purposes of this disclosure.

*Clutch means for forward and reverse drives*

Figure 4:
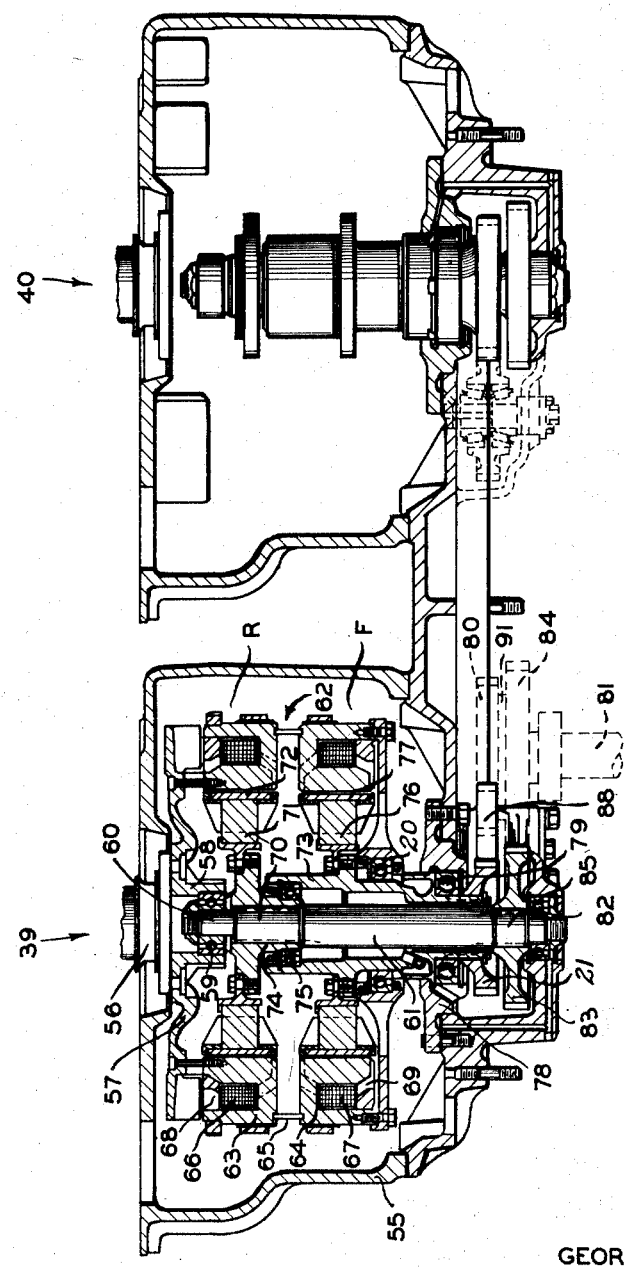
Figure 4 is a sectional view of the pair of clutch means of our present invention taken substantially along a horizontal plane passing through the output shafts of the clutch means.

Referring now to Figure 4, there is shown the clutch means 39 and 40 for effecting forward and reverse drives for the truck. The clutch means 39 and 40 each comprise two eddy current type clutches, more commonly known as electro-dynamic clutches, which are arranged coaxially in end to end axial spaced relation, and which are selectively controllable through suitable switch means, so that the operator may select either one or the other clutch for operation. These clutches, a pair of which are associated with each prime mover 37 and 38, are adapted to transmit torque from the prime movers through suitable transmission means 41 and 42 to the dual axle drive means 43. The operator, through a suitable control lever, may select one of a plurality of speeds simultaneously of both of the transmission means 41 and 42, irrespective of whether forward or reverse drive through the electric clutches is selected.

By the provision of electro-dynamic clutches, we eliminate wear and replacement difficulties heretofore encountered in connection with vehicles of this type, due to the heavy service placed upon clutches of such vehicles in normal operation. There is no frictional contact in the present clutch construction and, consequently, there is no wearing of parts.

Furthermore, electro-dynamic clutches of the present construction may be controlled by a switch or a clutch pedal, and may be selectively operable to increase or decrease the slippage through the clutch for regulating the transmission of torque from the prime movers 37 and 38 to the transmission means 41 and 42. This, in effect, is the same as the slippage of a friction clutch, but does not offer the disadvantages of a construction of this type, since there are no frictionally contacting parts. For purposes of the present disclosure, it is believed that a detailed description and showing of the clutch means 39 will be sufficient since the clutch means 39 and 40 are of identical construction.

The clutch means 39 comprises a housing 55, which may be secured in a known manner to the flywheel housing of the prime mover 37 (not shown in this view) having a crankshaft 56. Bolted or otherwise suitably secured to the crankshaft 56 is a flange member 57, having a hub portion 58 which is suitably bored to receive a ball bearing assembly 59 for journalling the reduced end 60 of the main clutch shaft 61 therein. The shaft 61 is journalled adjacent its other end in a ball bearing assembly 85 which is disposed within the rear end wall of the housing 55. Secured to the outer peripheral edge of the flange member 57 is a rotatable housing indicated at 62. This rotatable housing 62 comprises two annular flywheel casings 63 and 64, preferably joined together, as indicated at 65, by welding or the like, which casings carry enclosed therein magnetic cores or field windings 66 and 67, respectively. The flywheel casings are preferably provided with air passages, such as at 68 and 69 for dissipating the heat generated within the magnetic cores 66 and 67 when the coils are being electrically energized.

Electrical connection is selectively effected with the magnetic cores 66 and 67 by means of conventional brushes and collector rings (not shown).

Splined to the intermediate portion 70 of the shaft 61 is a rotor 71 having an annular pole piece 72. The pole piece 72 is of substantially the same axial extent as the inner surface of the flywheel casing 63, and it will be noted that a very small but uniform air gap is maintained therebetween. Upon energization of the core 66 an eddy current is set up within the flywheel casing 63 which tends to attract the pole piece 72 for conjoint rotation therewith. The amount of current introduced into the core 66 effects control of the magnetic field and determines the amount of slippage that will take place between the flywheel casing 63 and the pole piece 72.

A sleeve member 73 is journalled at one end thereof on the hub portion 74 of the rotor member 71 by means of a ball bearing assembly 75. The sleeve member 73 adjacent its other end is journalled between the main portion of the shaft 61 and a ball bearing assembly 79 in a plate member 78 mounted on the housing 55. The rotatable housing 62 is journalled adjacent its free end on the sleeve member 73 by means of a ball bearing assembly 20.

A second rotor 76 is suitably secured to the sleeve member 73 intermediate the ends thereof and the rotor 76 carries an annular pole piece 77 adjacent the outer periphery thereof. The pole piece 77 is of substantially the same axial extent as the inner surface of the flywheel casing 64 and there is also a small but uniform air gap maintained therebetween.

Upon energization of the core 67 an eddy current is set up within the flywheel casing 64 which tends to attract the pole piece 77 for conjoint rotation therewith.

Mounted to the outer end of the sleeve member 73 is a gear 21 which is adapted to have meshing engagement with an idler gear 88 which in turn has meshing engagement with a gear 80 of a dual gear 91 carried on the transmission input shaft 81 shown in dotted lines. Secured to a reduced portion 82 of the clutch shaft 61 is a gear 83 which is adapted to have meshing engagement with gear 84 of the dual gear 91, on the aforementioned transmission input shaft 81.

When it is desired to drive wheels 36—36 in a forward direction coil 67 is energized which causes the rotor member 76 to rotate conjointly with the flywheel casing 64, thus causing gear 21 to drive idler gear 88 which in turn drives the gear 89 on the transmission shaft 81. When it is desired to reverse the drive of wheels 36, coil 67 is deenergized and coil 66 energized. This causes the rotor member 71 to rotate conjointly with the flywheel casing 63, thus causing the main clutch shaft 61 to rotate, which drives gear 83 and in turn gear 84 of the transmission shaft 81. This effects reverse rotation of the transmission shaft 81 with respect to the main clutch shaft 61.

In a manner similar to that described above but by the reverse energization of the coils of the clutches, clutch means 40 may be selectively actuated to effect driving of the wheels 36—36 either forwardly or rearwardly. In other words, energization of coil 67 of clutch means 40 effects reverse drive of wheels 36—36, while de-energization of coil 67 and energization of coil 66 drives the wheels 36—36 forwardly. A pair of clutches are provided for each pair of forward drive wheels so that they may be clutched independently of each other.

*Planetary gear transmissions*

We further propose to provide the industrial truck of our present invention with a pair of planetary gear transmissions 41 and 42 for effecting a plurality of drive ratios between the drive and driven shafts of the transmission. Planetary transmission means are particularly desirable because of the ease with which they may be controlled to effect changes in gear ratios and when used in conjunction with one pair of the aforedescribed forward and reverse drive electrodynamic clutches, provides a form of power transmission means particularly adaptable for use in obtaining the desired forward or reverse drive ratios for an industrial truck of the character noted.

Figure 5:
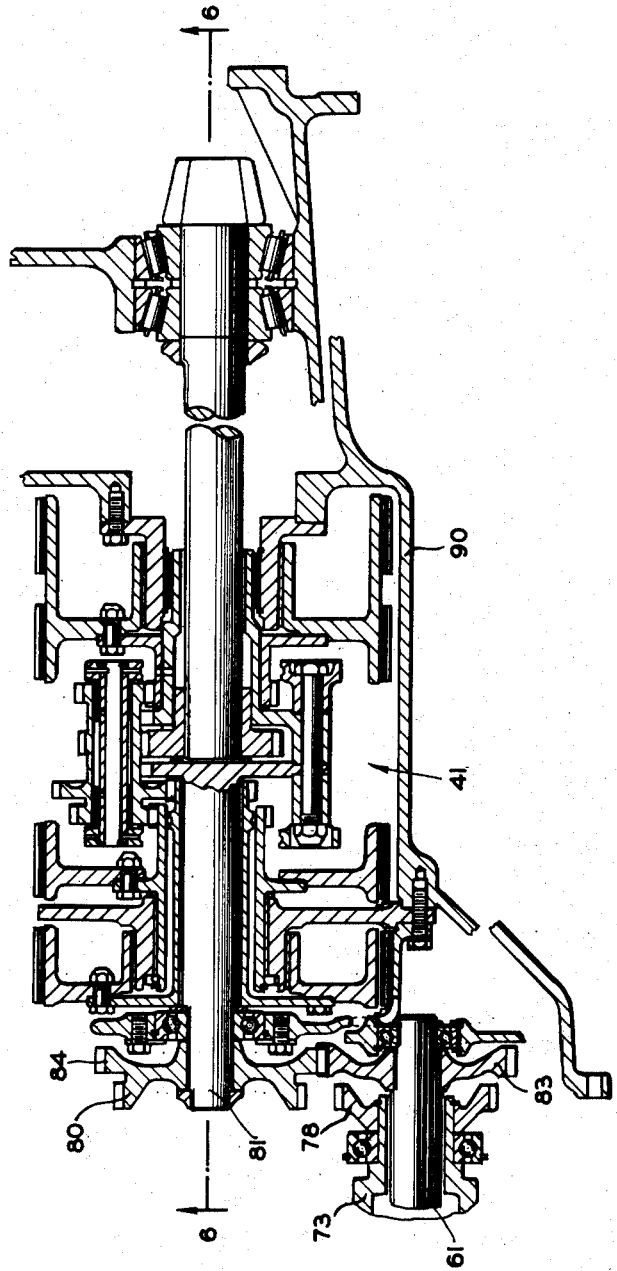
Figure 5 is a sectional view of one of the transmissions for one of the prime movers taken substantially along a horizontal plane passing through the drive and driven shafts of the transmission showing the connection between the drive shaft of the transmission and the output shaft of one of the clutch means of Figure 4.
Figure 6:
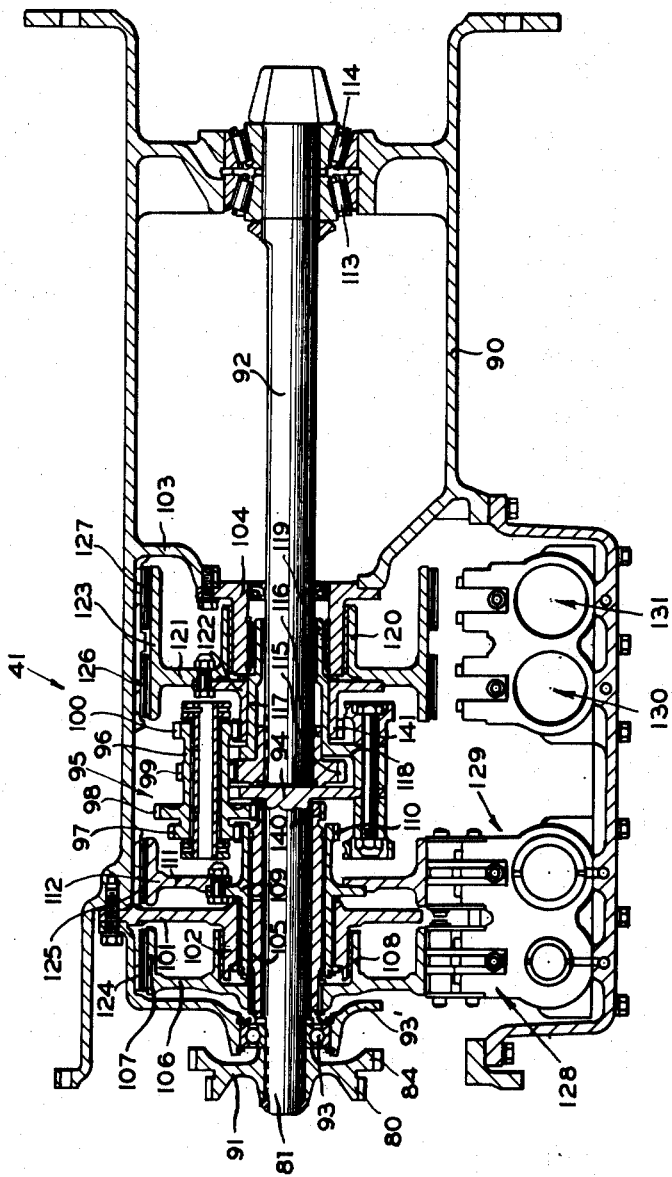
Figure 6 is a vertical sectional view taken substantially along line 6—6 of Figure 5 looking in the direction indicated by the arrows and showing brake means for the transmission.

Referring now to Figures 5 and 6, there is shown in detail one of the two planetary transmissions embodied in the truck. Since both transmissions 41 and 42 are of the same construction, it is believed that a detailed showing and description of one will be sufficient for the purposes of the present disclosure. The transmission means 41 is disposed within a housing 90 which is suitably secured at its one rear end in a known manner, as by bolts, to the front end of the clutch housing 55 and at its front end to the housing provided for the dual axle drive means 43 which will be fully described hereinafter.

Disposed lengthwise within the transmission housing 90 in end to end co-axial spaced relation are a drive shaft 81 and a driven shaft 92. The drive shaft 81 is journalled adjacent one end thereof in a ball bearing assembly 93 mounted in a bearing supporting member 93' mounted inwardly of the rear end of the transmission housing 90. The other end of the drive shaft 81 has an integral flange member 94 the purpose of which will be hereinafter described. Secured adjacent the periphery of the flange member 94 is a planet carrier 95 which carries planet pinion means 96, including multiple integral coaxially arranged planet pinions 97, 98, 99 and 100.

The transmission housing 90 is provided adjacent its rear end with an inwardly extending flange member 101 having a laterally projecting annular flange 102 formed integrally therewith. The housing 90 is further provided intermediate its ends with an inwardly extending flange member 103 having a first laterally projecting annular flange member 104 secured as by bolts thereto.

Rotatably mounted on the drive shaft 81 is a first sleeve member 105 having secured adjacent its forward end a first reaction pinion 140 which is adapted to have meshing engagement with the planet pinion 98 of the planet pinion means 96. Adjacent the other end of the sleeve member 105 is secured a brake drum 106 having a rim portion 107 and an intermediate laterally projecting annular flange 108 which is adapted to be journalled on the laterally projecting annular flange 102 of the flange member 101.

Rotatably mounted on the first sleeve member 105 is a second sleeve member 109 having secured adjacent its forward end a second reaction pinion 110 which has meshing engagement with the planet pinion 97 of the planet pinion means 96. The second sleeve member 109 adjacent its other or rear end is journalled between the inner peripheral surface of the lateral annular projection 102 of the inwardly extending flange member 101, and the outer peripheral surface of the first sleeve member 105. Secured to the second sleeve member 109 intermediate its ends is a second brake drum 111 having a rim portion 112.

The driven shaft 92 is journalled adjacent its forward end within a pair of roller bearing assemblies 113 and 114 which are mounted in the forward end wall of the transmission housing 90. Secured to the other end of the driven shaft 92 is a sun gear 115, which has meshing engagement with the pinion 99 of the planet pinion means 96. Journalled on the hub portion 116 of the sun gear 115 is the enlarged portion 117 of a stepped sleeve member 118, which is secured to the planet carrier 95. The reduced forward end portion 119 of the stepped sleeve member 118 is journalled in pin bearings disposed between it and the inner peripheral surface of the annular laterally projecting sleeve 104. Journalled on the outer peripheral surface of the member 104 is the laterally projecting annular flange 120 of a third brake drum 121 having a rim portion 123. Mounted to the brake drum 121, as by bolts, is a second laterally projecting annular flange member 122 which is journalled on the intermediate portion 117 of the stepped sleeve member 118. The flange member 122 adjacent its outwardly projecting end has a pinion 141 secured thereto which is adapted to have meshing engagement with the pinion 109 of the planet pinion means 96.

Cooperating with the rim portion 107 of the brake drum 106 is a brake band 124, which is adapted to be selectively actuated by brake actuating means at 128, for braking the brake drum 106 against rotation. Cooperating with the rim portion 112 of the brake drums 111 is a brake band 125 which is adapted to be selectively actuated by brake actuating means, indicated at 129, for braking the brake drum 111 against rotation. Cooperating with the rim portion 123 of the brake drum 121 are a pair of brake bands 126 and 127, which are adapted to be selectively actuated conjointly by brake actuating means, indicated at 130 and 131 respectively, for braking the brake drum 121 against rotation.

Since the brake actuating means 128, 129 and 130, 131 are fundamentally of the same construction and differ only in minor details and size and position, it is believed that a showing and description of one will be sufficient for the present disclosure.

Referring now to Figure 7, there is shown the brake band 124 which is adapted to cooperate with the brake drum 106. The brake band 124 is operated by brake actuating means, indicated generally at 128, which comprises a horizontally extending cylinder 132 in which a pair of pistons 133 and 134 are disposed in spaced apart end to end relation. Fluid, under pressure generated by a suitable pump provided for the truck, is forced into the cylinder 132 through an opening (not shown) in a manner to force the pistons 133 and 134 outwardly away from each other, thus causing the brake band 124 to engage the rim 107 of the brake drum 106 for braking it against rotation. Piston rings 135 and 136 are one each provided for each of the pistons 133 and 134 for substantially preventing the leakage of fluid thereby.

A pair of levers 138 and 139 are pivotally secured, as at 142 and 143, to a mounting member 137 therefor which is suitably mounted to the transmission housing 90. The levers 138 and 139, adjacent their ends overlying pistons 133 and 134 respectively, are provided with rollers 144 and 145 which are adapted to engage therewith. The levers 138 and 139 are pivotally secured adjacent their other ends one each as at 148 and 149 to links 146 and 147. The links 146 and 147 are, in turn, pivotally secured adjacent their free ends one each as at 216 and 217 to links 218 and 219 respectively, which are pivotally secured adjacent their other ends as at 220 and 185 to mounting member 137. The mounting member 137, as shown, is formed with spaced apart limiting shoulders 137a and 137b, which are adapted to be engaged by one or the other of links 146 and 147 at their pivoted ends 216 and 217, respectively. The stops or shoulders 137a and 137b provide for limited relative rotary movement of the brake band 124 to provide a self-energizing brake as will presently appear. A disengaging spring 186 is secured adjacent its ends to the intermediate portions of the levers 138 and 139 and 187 and 188.

The opposite ends of the brake band 124 are doubled over and fitted around the laterally extending rods 221 and 222 which are mounted at 216 and 217 at the pivotal connection between the links 146 and 218 and the links 147 and 219 respectively. The doubled over ends of the brake band 124 are secured at 223 and 224 as by a plurality of rivets 240.

When it is desired to brake the brake drum 106 against rotation, as, for example, in a counter-clockwise direction as shown in Figure 7, fluid under pressure is admitted in to the cylinder 132 between the pistons 133 and 134 to force them away from each other. The frictional engagement of the brake band 124 with the drum 126, as shown in this figure, effects movement of the link 147 into abutting engagement with stop shoulder 137b which serves as a reaction point in the application of the brake. In the opposite direction of rotation of the drum 126 and upon admission of fluid under pressure between pistons 133 and 134, the brake band and links 146 and 147 rotate slightly clockwise to effect engagement of the inner end of link 146 with shoulder 137a. The pair of pistons 133 and 134 are movable as a unit within cylinder 132 in the aforesaid movement of the links as described, to provide a self-energizing brake operable in either direction of rotation of brake drum 126.

When it is desired to release the braking effect of brake band 124 on the rim 107 of the brake drum 106, the fluid under pressure in cylinder 132 is bled therefrom. The disengaging spring 186 urges the lever 138 to rotate counterclockwise about its pivotal connection at 142, and the lever 139 to rotate clockwise about its pivotal connection at 143. The rotation of the levers 138 and 139 causes the links 146 and 147 with their associated laterally projecting rods 221 and 222, to move away from each other, the rod 221 and 222, to move away from each other, the rods 221 and 222 moving on the circumference of circles generated by radii emanating respectively from the pivotal connections 220 and 185. In this manner, the brake band 124 is disengaged from the rim 107 of the brake drum 106, thus permitting the brake drum 106 to rotate freely.

Upon actuation of the brake band 124 to hold the brake drum 106 against rotation, it will be observed that the reaction pinion 140 mounted on the sleeve member 105, will be held against rotation. Thus when the drive shaft 81 is rotating, the planet pinion 98 carried by the planet carrier means 95 is adapted to rotate about pinion 140, and the planet pinion 99 drives the sun gear 115 mounted on the driven shaft 92 to effect one drive ratio between the drive and driven shafts 81 and 92. A second drive ratio is adapted to be effected by disengaging the brake band 124 and engaging the brake band 125 so as to hold the brake drum 111 against rotation. Now the reaction pinion 110 is held against rotation so that the planet pinion 97 is adapted to rotate thereabout, when the drive shaft 81 is rotating, thus causing the planet pinion 99 to drive the sun gear 115 mounted on the driven shaft 92 whereupon a second drive ratio is effected between the drive and driven shafts 81 and 92. Still another drive ratio is adapted to be effected by disengaging the brake band 125 and engaging the brake bands 126 and 127 so as to hold the brake drum 121 against rotation. This holds the reaction pinion 141 against rotation so that the planet pinion 100 is adapted to rotate thereabout, when the drive shaft 81 is rotating thus causing the multiple planet pinion 99 to drive the sun gear 115 mounted on the driven shaft 92 whereupon a third drive ratio is effected between the drive and driven shafts 81 and 92.

It will be observed from the above that the three brake drums 106, 111 and 121 are adapted to be braked individually with respect to each other and in which the actuation of one of these brake drums provides for one of three drive ratios between the drive and driven shafts of the transmission.

*Dual axle drive means*

Figure 9:
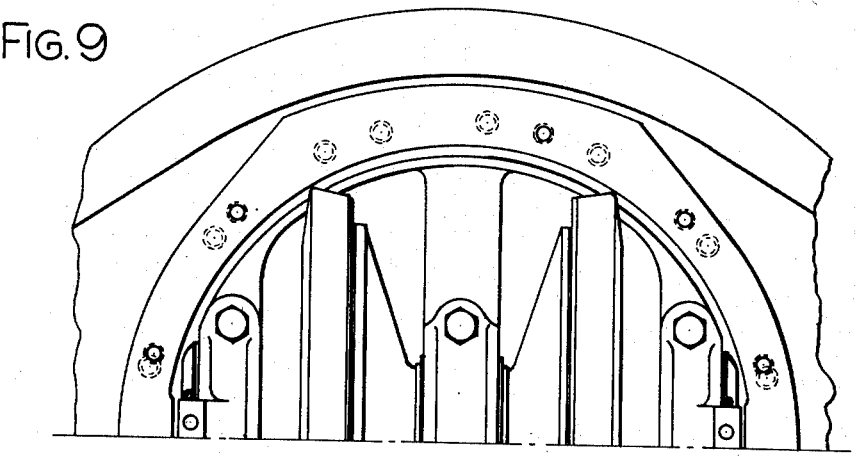
Figure 9 is a partial front elevational view of the dual axle drive means of Figure 8 with the front cover member removed.
Figure 8:
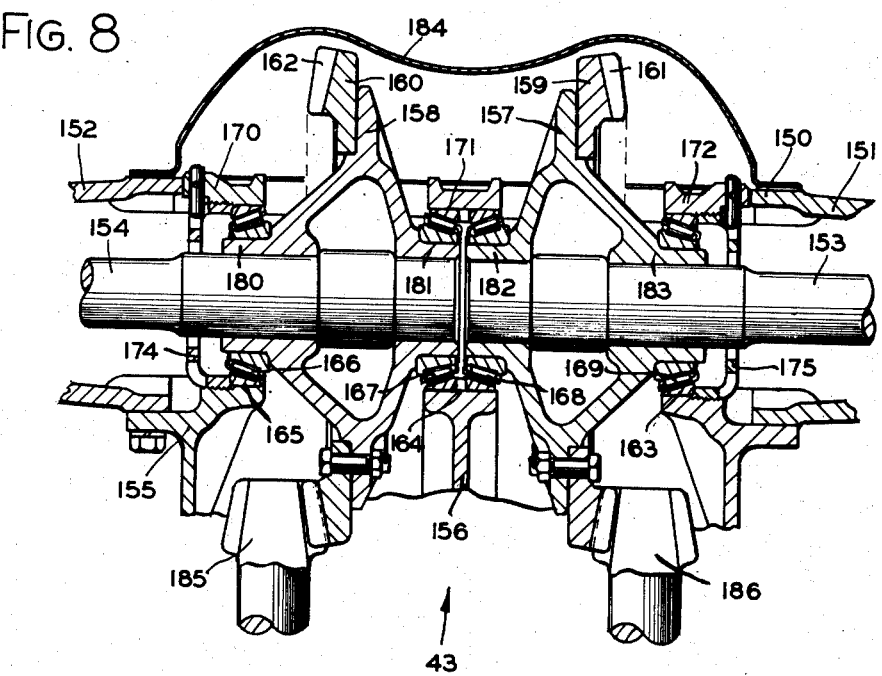
Figure 8 is a horizontal sectional view of the dual axle drive means of our present invention taken substantially along a horizontal plane passing through the drive axles of the truck.
Figure 14:
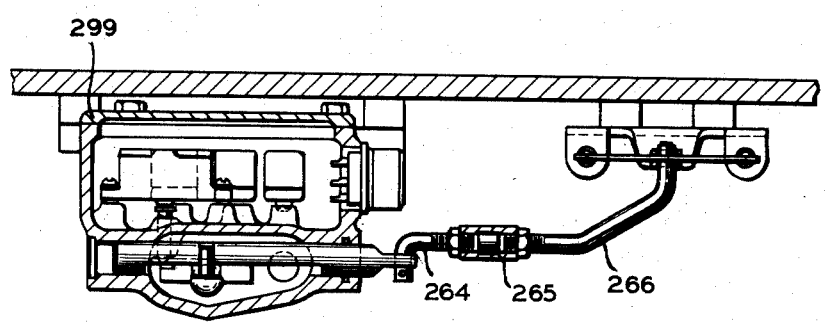
Figure 14 is a vertical sectional view of the control means taken substantially along the line 14—14 of Figure 12 looking in the direction of the arrows.

Reference may now be had to Figures 8 and 9 for a description of the dual axle drive means 43 of our invention for transmitting power from each of the transmissions 41 and 42 to its associated dual drive wheels 35—35 and 36—36 independently with respect to each other.

The drive means 43 comprises a banjo type housing 150 having openings formed in the opposite sides thereof from which axially aligned axle tubes 151 and 152 project. The axle tubes 151 and 152 are supported adjacent their outer ends in the openings 29 and 30, respectively of the main side frame members 27 and 28 shown in Figure 3. Disposed within the housing 150 are a pair of rotatable axles 153 and 154 disposed in end to end coaxial relation, which have mounted in a conventional manner adjacent their outer ends the pair of dual drive wheels 35—35 and 36—36, respectively, for rotation therewith. A pinion housing 155 is secured at its rearward end as by bolts about an opening in the rear of the banjo housing 150 and at its other end to the transmission housing of the transmissions 41 and 42. The pinion housing 155 is provided with an internal web 156 which is spaced centrally from each side wall thereof. Mounted at each of the adjacent inner ends of the axles 153 and 154 are a pair of ring gear flanges 157 and 158 which have axially spaced hub portions 182 and 183, and 180 and 181. The flanges are provided adjacent their outer peripheral edges with a pair of annular ring gears 159 and 160 having a plurality of bevel teeth 161 and 162, respectively.

Formed by the ends of the sides and central web 156 of the pinion housing 155 are a plurality of bearing seats 163, 164, and 165. Disposed within seat 165 is a roller bearing assembly 166, within seat 163 a roller bearing assembly 169, and within seat 164 a pair of roller bearing assemblies 167 and 168. In order to secure the roller bearing assemblies within their respective seats a plurality of bearing caps are provided. A cap 170 is provided for roller bearing assembly 166, a cap 171 for assemblies 167 and 168 and a cap 172 for the assembly 169. These caps may be secured, as by bolts, to the forward end of the pinion housing 155. Bearing retaining members 174 and 175 are provided for the roller bearing assemblies 166 and 169 for preventing axial movement thereof. The roller bearing assemblies 166 and 167 provide for the journalling of the outer peripheral surfaces of the hub portions 180 and 181, respectively, of the flange 158 while the roller bearing assemblies 168 and 169 provide for the journalling of the outer peripheral surfaces of the hub portions 182 and 183, respectively, of the flange 157. A cover member 184 is secured about the front opening in the housing 150 opposing the opening to which the pinion housing 155 is secured about.

Mounted to the forward ends of the driven shafts of the transmissions 41 and 42 are a pair of pinions 185 and 186 which are adapted to have meshing engagement with the ring gears 160 and 159, respectively, as shown in Figure 8.

From the foregoing it will be observed that forward drive may be simultaneously effected through the forward drive clutches of the clutch means 39 and 40, the transmission means 41 and 42, drive shafts 153 and 154, to the dual drive wheels 35—35 and 36—36 of the industrial truck 25.

It is also possible to effect forward drive through the forward drive clutch of the clutch means 39, the transmission means 41, and drive shafts 153, and finally to the dual drive wheels 35—35 of the truck 25, while simultaneously disengaging the dual drive wheels 36—36 from forward or reverse drive. Thus the truck with the aid of the rear steering assembly 44 may be pivoted about the dual drive wheels 36—36. The above procedure may be reversed and the truck pivoted about the dual drive wheels 35—35 while forward drive is imparted to the dual drive wheels 36—36. It also should be mentioned at this point that reverse drive may be imparted to either of the dual drive wheels 35—35 or 36—36 while the other is disengaged from either forward or reverse drive and thus the truck may be selectively pivoted about either pair of dual drive wheels 35—35 or 36—36 when the truck is being driven rearwardly. It is further possible to effect forward drive through the forward drive clutch of the clutch means 39, the transmission means 41, drive shaft 153 and finally to the dual drive wheel 35—35, while reverse drive is simultaneously effected through the reverse drive clutch of the clutch means 40, the transmission means 42, drive shaft 154, and finally to the dual drive wheels 36, 36. Thus, while the dual drive wheels 35—35 are being driven forwardly the dual drive wheels 36—36 are driven rearwardly so as to effect, with the aid of the rear steering assembly 44, pivoting of the truck 25 about a point midway between the dual drive wheels 35—35 and 36—36.

Steering and rear wheel construction

Referring now to Figures 2, 10 and 11, we shall describe the construction of the rear wheel mounting and the steering mechanism associated therewith. In order that full advantage may be taken of the pivoting of the truck about a point midway between the forward dual drive wheels we provide the truck with a rear steering wheel that may be rotated through at least 180° and further provide a steering mechanism that is adapted to effect rotation of the steering wheel through at least 180°.

Figure 3:
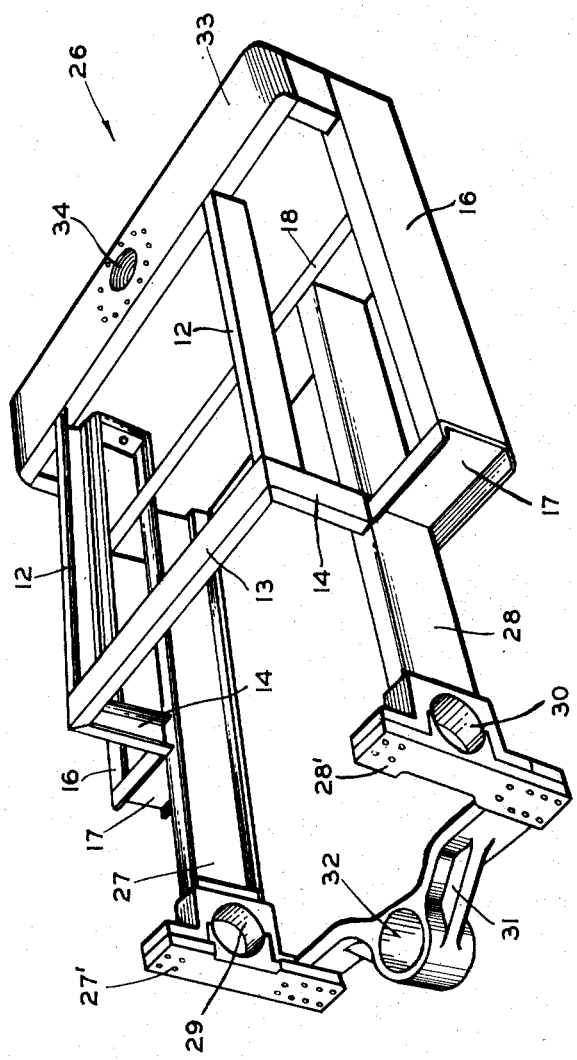
Figure 3 is a perspective view of the main frame of the industrial truck shown in Figure 1.

The rear steering wheel mount, as best shown in Figure 11, comprises vertically downwardly projecting housing 200 which is secured adjacent its upper end preferably by bolts 201, to the transverse frame member 33 of the main frame 26 shown in Figure 3. A vertically extending shaft 202 is rotatably mounted within the housing 200 by means of roller bearing assemblies 203 and 204 located adjacent the upper and lower ends of the shaft 202, respectively. Secured to the lower portion of the shaft 202 is an extension or cap member 205. A bracket member 206 is provided adjacent the lower portion of the shaft 202, and has a central recess formed therein for receiving the cap member 205. The bracket 206 is provided adjacent the lower portion of the shaft 202, and has a central recess formed therein for receiving the cap member 205. The bracket 206 is rotatably mounted to the lower end of cap member 205 about a pin 207 which extends horizontally between member 205 and bracket member 206. The bracket 206 is provided adjacent its opposite sides with a pair of arms 208 and 209 having spindle receiving sockets which extend outwardly and slightly downwardly. A pair of spindles 210 and 211 are mounted in the sockets of the arms 208 and 209 and carry adjacent their outer free ends a pair of dirigible wheels having tires 212 and 213 mounted thereon.

From the foregoing description it will be seen that the bracket 206 is adapted to rotate about substantially a horizontal axis on pin 207 carried by the cap member 205. Thus only half of the vertical movement of the wheel 213 with respect to the wheel 212 will be transmitted to the body of the truck since if the wheel 213 is considered to follow a relatively horizontal path while wheel 212 moves vertically a certain distance with respect to the wheel 213, because of obstructions in the path of the wheel 212, the midpoint of bracket 206 moves upward only half the distance that the wheel 212 does inasmuch as the bracket 206 rotates about the horizontal axis provided by the pin 207.

The vertical shaft 202 of the rear wheel mount 44 is adapted to be rotated by means of a steering mechanism which will be hereinafter described. The steering mechanism of our invention is adapted to translate rotative movement of the steering wheel 225, shown in Figure 10, into rotative movement, at least 180°, of the rear wheel mount 44 of the truck 25 by means of a substantially rectilinearly movable member 226 interposed between the steering wheel 225 and the rear wheel mount 44.

The steering mechanism of our invention, as shown best in Figures 2 and 10, comprises a link 226 which is adapted to have connection adjacent its one end to a crank arm 227, that is connected to the steering wheel 225, in a known manner, for rotation therewith, adjacent the lower end of the steering column 228 and is adapted to effect rectilinear movement of the link 226. The link 226 at its other end is pivotally secured to the lower arm 229 of a bell crank indicated at 230. The arm 229 is secured to the lower end of a vertically extending shaft 229' which at its upper end carries the other arm 230' of the bell crank. A bell crank of the construction noted is utilized to provide for translating rectilinear movement of rod 226 to the steering linkage, further to be described, above the rear steering wheel assembly 44.

A link 231, adjacent its one end, is pivotally mounted at 232 to the frame of the truck 25. A link 233 at one end thereof is pivotally mounted to link 231 intermediate of the ends thereof at 234, and adjacent its other end, at 235, is pivotally secured to the upper arm 230' of bell crank 230. The other end of link 231 is pivotally connected at 236 to one end of a link 237. The other end of link 237 overlies the free end of a crank arm 239, and is pivotally connected thereto, as indicated at 238. The crank arm 239 as shown is rigidly secured to the vertical shaft 202 of the rear wheel mount 44.

The mechanism above described provides for translating rectilinear movement of link 226 into rotary movement of shaft 202. When, for example, the shaft 202 and the wheels 212 and 213 associated therewith are to be rotated counterclockwise from the position shown in Figure 2, the steering wheel 225 is manipulated in such a manner as to effect movement of the link 226 forwardly. The substantially rectilinear movement of link 226 is transformed into counterclockwise rotation of the crank arm 239 and shaft 202 through links 237, 231 and 233, and bell crank 230.

When the shaft 202 is to be rotated clockwise from the position shown in Figure 2, the steering wheel 225 is manipulated in a manner so as to effect movement of the link 226 rearwardly. The substantially rectilinear movement of link 226 is transformed into clockwise rotation of the crank arm 239 and shaft 202 through the links 237, 231 and 233, and bell crank 230.

While for purposes of steering rotation of the shaft 202 through 180° is the maximum rotation necessary or desired, it should be realized that rotation substantially in excess of 180° may be obtained with the mechanism of our invention.

A related steering mechanism of the type above described is disclosed in the co-pending application of George L. Turner, one of the present joint applicants, Serial No. 99,779, filed June 17, 1949.

Steering control system

Having set forth the details of construction of the industrial truck of our present invention, we shall now describe the construction and operation of the control system which we provide for independently and automatically regulating the speed of each prime mover and for effecting actuation of the forward or reverse drive clutches of each clutch means in response to rotary movement of the steering wheel which is manipulated by the operator of the truck. By incorporating the use of an automatic control system of a character which will be fully described hereinafter, the operator of the truck is not required to manipulate controls other than those used in conjunction with industrial trucks of conventional construction. Such controls, may for example, comprise a steering wheel, a brake pedal, an accelerator pedal, a transmission gear ratio selector lever, and a lever for effecting forward or reverse drive of the truck.

Figure 15:
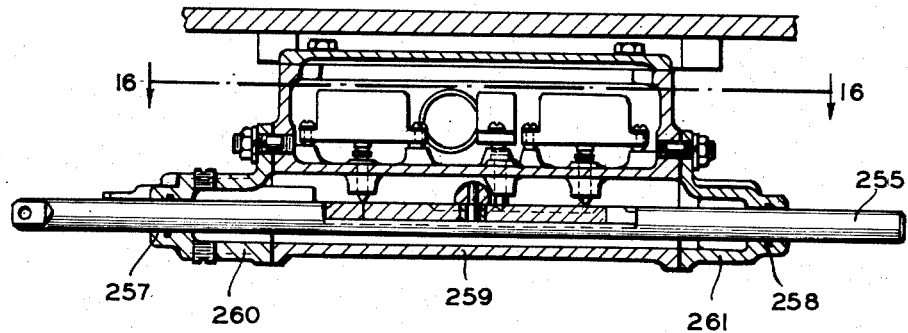
Figure 15 is a vertical sectional view of the control means taken substantially along the line 15—15 of Figure 12 looking in the direction of the arrows.

The automatic control system of our present invention comprises a main control box indicated generally by the reference numeral 250 which is best shown in Figures 10 and 12. The main control box comprises a body portion 259, a cover 299 and a pair of projecting end extensions 260 and 261 mounted to opposite ends of the body portion 259. Journalled adjacent its opposite ends in the projecting end portions 260 and 261 as at 257 and 258 is a rectilinearly movable rod 255. Also journalled adjacent its ends in the end extensions of the control box 250 is a second rectilinearly movable rod 318 which has connection in a suitable manner to the aforementioned manually operable forward-reverse selector lever provided adjacent the drivers seats. As shown in Figure 10, one end of the rod 255 is connected to the crank arm 227 of the steering column 228 by means of a link 256. Thus the rod 255 is adapted to be moved rectilinearly in response to rotary movement of the steering wheel 225. Secured in a recess formed in the upper portion of the rod 255, as best shown in Figures 13 and 15, is a rectangular face cam 251, which is disposed within the control box 250. The cam 251 as best shown in Figure 13 has a serpentine groove 252 formed therein with which a follower 253 having a roller 254 is adapted to be associated. Rectilinear movement of face cam 251 is translated into rectilinear movement of the follower 253 at right angles thereto.

The face cam 251 is further provided with a pair of lengthwise extending recesses 262 and 263 one adjacent each side thereof, and beveled edges 293 and 294 formed at the opposite ends thereof for a purpose which will hereinafter be described in detail.

Loosely secured to one end of the follower 253 is an L-shaped link 264. The other end of link 264 is connected through a turnbuckle 265 to one end of a link 266 which is loosely secured adjacent its other end to the intermediate portion of a rocker member 267. The rocker member 267 is pivotally secured at 268 to a fixed supporting frame 269 which has formed adjacent each of its sides a pair of spaced apart flanges 270, 271, 276 and 277 projecting at right angles therefrom, and having openings formed therein. Extending through the openings formed in the flanges 270, 271, 276, and 277 are plungers 272 and 273 which have enlarged bifurcated head portions 274 and 275 at the ends thereof disposed adjacent the flanges 276 and 277. Disposed about the plungers 272 and 273 are coil compression springs 278 and 279 which are held within the confines of the flanges 276, 277, 270, and 271. The springs 278 and 279, adjacent their one ends, abut the flanges 276 and 277, and, adjacent their other ends, engage washers 280 and 281 which are carried by the plungers 270 and 271. It will thus be observed that the enlarged head portions 274 and 275 of the plungers 270 and 271 are normally biased toward the flanges 276 and 277 and the ends of the plungers are biased in abutting relation with the ends of the rocker arm 267 by the springs 278 and 279.

The enlarged portions 274 and 275 of the plungers 270 and 271 are pivotally connected at 284 and 285 to the intermediate portions of levers 282 and 283, which levers are each pivotally secured adjacent their inner ends to a foot accelerator link 286 by means of a pin 287 which is guided within a slot 288 formed in the end of the support 269 opposite the end thereof to which the rocker member 267 is pivotally mounted. The outer ends of the levers 282 and 283 are pivotally secured as at 289 and 290, to throttle actuating links 291 and 292, which are connected in a conventional manner to the carburetors for the prime movers of the truck.

Figure 16:
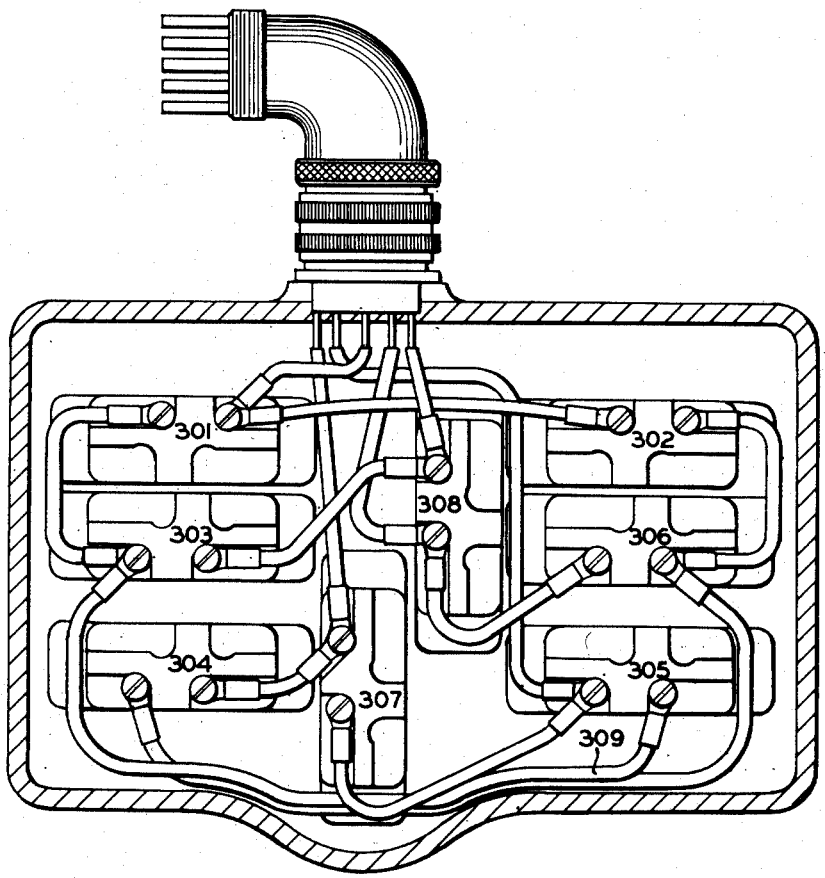
Figure 16 is a horizontal sectional view of the control means taken along the line 6—16 of Figure 15 looking in the direction of the arrows.
Figure 17:
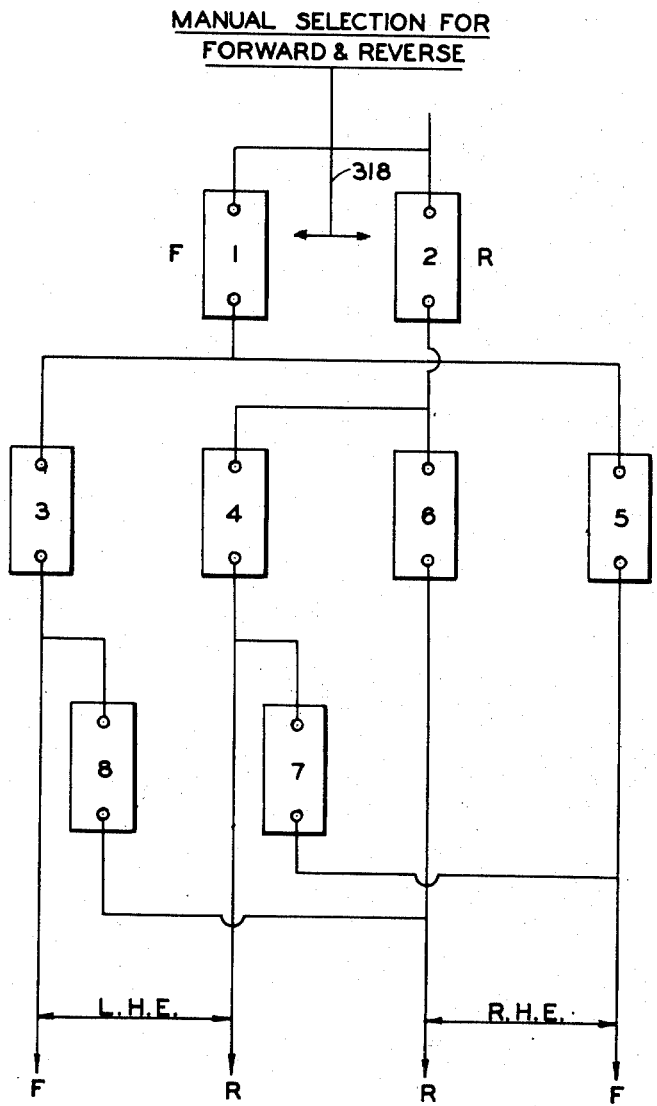
Figure 17 is a circuit diagram of the electrical connection between the several switches of the control means shown in Figure 16.

Also disposed within the intermediate portion 259 of the control box 250 and mounted thereto as shown in Figures 12, 14, 15, and 16, are a plurality of switches 301 through 308 interconnected by a plurality of leads 309 which control the flow of current from a suitable source, such as a battery, to the forward and reverse drive clutches of the clutch means 39 and 40. A diagrammatic view of the electrical connections between the switches 301 through 308 is shown in Figure 17, and this circuit will be referred to hereinafter. These several switches 301 through 308 are identified in Figures 17 and 18 by the Arabic characters 1 through 8, respectively.

The switches 301 through 308 are provided with actuating plungers 310 through 317 respectively, which are normally spring biased to open position. Switches 301 and 302 are adapted to be actuated by the rod 318 which is journalled adjacent its ends within the control box 250 for lengthwise movement therein. The rod 318 has formed in its upper surface, suitable depressions and projections for actuating the plungers 310 and 311 of the switches 301 and 302. Thus, when the projection on the rod 318 forces the plunger 310 upward, the electrical circuit in which the switch 301 is connected is closed. Conversely, when the projection is removed from under the plunger 310, the plunger drops and the electrical circuit is opened. The electrical connection of switch 302 is made and broken in a manner as described for the switch 301. When the plungers 312, 313, 314 and 315 are in engagement with the upper planar surface of the face cam 251, the switches 303, 304, 305 and 306 are closed, but when the cam is shifted to the right from the position shown in Figure 12, plungers 312 and 313 drop off the beveled end edge 294 of the cam and the switches 303 and 304 are opened, whereas if the cam is shifted to the left the plungers 314 and 315 drop off the beveled end edge 293 of the cam and the switches 305 and 306 are opened.

The plunger 316 of the switch 307 is adapted to engage either the upper planar surface of the face cam 251 or be disposed in the lengthwise groove 262 formed adjacent one side thereof, while the plunger 317 of the switch 308 is adapted to engage either the upper planar surface of the cam 251 or be disposed in the groove 263 formed adjacent the other side thereof depending on the lengthwise position of the face cam 251. When the plungers 316 and 317 engage the upper surface of the cam 251, the switches 307 and 308 are closed, while if the plungers 316 and 317 are disposed in the grooves 262 and 263, the switches are open.

From the foregoing it will be seen that by shifting the cam plate 251 in response to rotary movement of the steering wheel 225 certain combinations of the switches 301 through 308 are electrically opened and certain of them are electrically closed while the throttles of the prime movers are correspondingly mechanically shifted.

Figure 18:
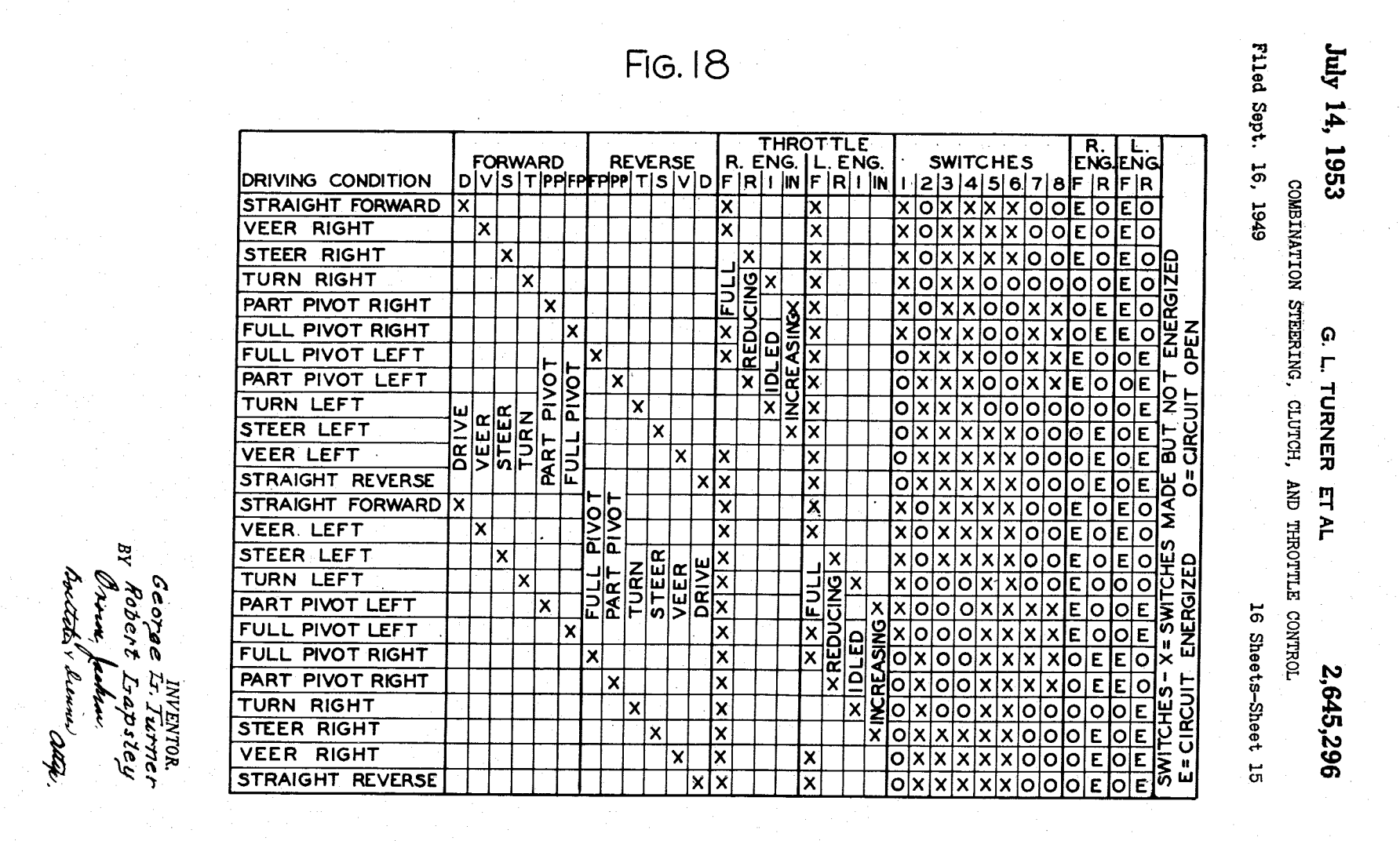

The following is a description of the operations of the industrial truck of our invention and it is intended that this description be read in connection with the chart of operations shown in Figure 18.

In order to initiate movement of the truck, the forward-reverse lever is placed in the neutral position and the prime movers 37 and 38 are then started. After the prime movers 37 and 38 are warmed up the desired gear ratio in the transmission means 41 and 42 is selected by actuation of the lever provided for this purpose. The rear steering assembly 44 is then positioned so as to dispose the rear steering wheels 212 and 213 substantially parallel with respect to the lengthwise axis of the truck. The forward-reverse clutch is then placed in the forward position.

While the truck is in the position described, the cam plate 251 within the control box 259 is disposed in a position so as to align the follower 253 and rocker member 267 in a neutral position, thus permitting the accelerator pedal through rod 286 to effect movement of rods 291 and 292 and the throttles connected thereto for each prime mover in unison. Switch 301, as shown in Figure 16, is closed by means of rod 318, which is actuated by the forward-reverse selector lever provided for the driver of the truck. Plungers 312, 313, 314 and 315 engage the upper planar surface of the cam plate 251 when the cam 251 is in a forward drive position, and thus switches 303, 304, 305 and 306 are closed and the electrical circuit is completed from the source of current, such as a storage battery carried by the truck to the pair of forward drive clutches indicated at F in Figure 17 of the clutch means 39 and 40. Now by pushing down on the accelerator pedal the truck may be driven forwardly.

When it is desired to veer to the right, the driver need only turn the steering wheel 225 a slight amount. The throttles, forward drive clutches and switches remain in the same relation as for effecting straight forward drive.

If it is desired to steer to the right, the driver turns the steering wheel 225 more than for a veering maneuver, which shifts the rod 255 to the left of the position shown in Figure 11 and carries with it the cam 251 which forces the follower 253 in a direction toward the rocker member 267. The rocker member 267 thus pushes the head 274 of the plunger 272 away from the flange 276 which causes the link 282 to pull the throttle lever 291 in a direction to reduce the throttle for the prime mover 37. Thereupon the throttle of the prime mover 37 is reduced from the drive throttle condition while the prime mover 38 continues at a normal drive throttle condition, which causes the wheels 35—35 to rotate slower than the wheels 36—36, thus aiding in the initial right steer maneuver.

Upon initiating a full turn to the right, the prime mover 37 is run under an idle throttle condition while the cam 251 which is shifted further to the left permits the plungers 314 and 315 to drop off the end bevel edge 293 of the cam 251, thus opening the switches 305 and 306 which de-energizes the forward drive clutch of the clutch means 39. The truck under these conditions, is powered solely by the prime mover 38 which is instrumental in effecting the right turn.

Continuing to turn the steering wheel 225 to the right initiates a part pivot maneuver. The cam 251 is shifted further to the left which causes the plungers 316 and 317 to be forced from the grooves 262 and 263 up to the upper surface of the cam plate 251. This closes switches 307 and 308 and the reverse clutch of the clutch means 39 is energized, driving the wheels 35—35 in reverse while the forward drive clutch of the clutch means 40 remains energized, driving the wheels 36—36 forward. The follower 253 as determined by the serpentine groove formed in the cam 251 is urged in a direction away from the rocker member 267, thus permitting the plunger 272 to move towards its normal position which effects an increase in the throttle of the prime mover 37, and the truck now begins to pivot about a point midway between the forward drive wheels 35—35 and 36—36.

If the driver's steering wheel is turned still further, the cam 251 is shifted to the left until the follower 253 returns the rocker member 267 to its neutral position, thus permitting the plunger 272 to return to its normal position which effects normal drive throttle condition for the prime movers 37 and 38. The prime movers 37 and 38 are now both under like drive throttle conditions and they drive the forward wheels 35—35 and 36—36 in opposite directions with respect to each other at an equal speed which speed is determined by the position of the accelerator.

At this point the truck may be driven in reverse in a full pivot left by simply moving the forward-reverse lever from the forward position to the reverse position. This shifts rod 318 which effects opening of the switch 301 and closing of the switch 302. The reverse drive clutch of the clutch means 39 is thus de-energzed and the forward drive clutch is energized while the forward drive clutch of the clutch means 40 is de-energized and the reverse drive clutch is energized.

It is believed that with the above description of several of the numerous maneuvers that may be accomplished by the truck, it will be unnecessary to describe each of the remaining maneuvers in detail since the conditions accompanying each may be clearly determined from the chart shown in Figure 18. The legend X indicates a closed switch, while the legend O indicates an open switch.

The truck of our present invention is further provided with a conventional hydraulic control system, shown diagrammatically in Figure 19, and since it forms no part of the present invention, we are including only a brief description for purposes of this disclosure.

Referring now to the drawing, there is shown a sump tank at 350 which feeds oil through lines 351 and 352 to a pair of pumps 353 and 354 that are connected in parallel. The pumps 353 and 354 discharge oil under pressure to a common line 355 which is connected adjacent its other end to a valve assembly indicated generally at 356. A return line 380 is provided between the valve assembly 356 and the sump tank 350. Interposed in the line 355 is a relief valve 357, which if a maximum predetermined pressure is exceeded, will permit the oil under pressure to by-pass back to the sump tank 350 through a connecting line 358. The valve assembly comprises valves 359, 360, and 361 which are of conventional construction.

Preferably, valve 360 is connected into the fluid circuit in a manner that will permit selective control of the flow of oil through lines 362 and 363 to a pair of hydraulic actuating assemblies 364 and 365 for tilting the forks 366 and 367. When fluid under pressure is forced through line 362 and line 363 is simultaneously bled, the pistons and rods of the hydraulic assemblies 364 and 365 are urged outwardly, while if the fluid under pressure is forced through line 363 and line 362 is simultaneously bled the pistons and rods of the hydraulic assemblies 364 and 365 are urged inwardly. The mechanism for tilting the forks is fully described in the copending application of George L. Turner, Serial No. 115,397, dated September 13, 1949, now Patent No. 2,608,315 referred to above.

Preferably valve 361 is provided to control selectively the flow of oil from line 355 through line 368 to the hydraulic piston and cylinder assembly 50 for raising the lift forks 366 and 367. A line 369 interconnects the upper portion of the hydraulic piston and cylinder assembly 50 to the sump tank 350 and provides a path by which oil leaking past the piston of the assembly 50 may return to the sump tank 350. By actuating the valve 361 so as to remove the pressure in line 368, a load that has been raised will then be lowered by virtue of its own weight.

In order that an additional hydraulically operated attachment may be secured to the present embodiment of our truck without considerable modification being required therefor, we have provided the additional valve 359 which may, for example, be connected in the fluid circuit so as to selectively control the flow of oil under pressure to a hydraulic actuating assembly 370 which is adapted to effect lateral shifting of the forks 366 and 367 as disclosed in our copending application Serial No. 100,684, dated June 22, 1949.

While we have shown and described a preferred embodiment of our invention, it will be obvious that various modifications may be made therein without departing from the spirit and scope of our invention.

We claim:

1. In a control system for an industrial truck having an operator's steering wheel and a pair of driving wheels each having associated therewith an engine, electrodynamic clutch means including forward and reverse drive clutches, and a transmission, the combination of apparatus including a plurality of switches for effecting energization of said clutches, first means for selectively opening and closing said switches for effecting electrical energization of none or one of the forward or reverse drive clutches associated with each of the electrodynamic clutch means, and second means between said steering wheel and said first means for effecting actuation of the latter in response to rotary movement of said steering wheel.

2. In a control system for an industrial truck having an operator's steering wheel and a pair of driving wheels each provided with an engine, electro-dynamic clutch means having forward and reverse drive clutches, and a transmission, the combination of apparatus including a plurality of switches for effecting energization of said clutches, a cam adapted to effect actuation of said switches for controlling the electrical energization of none or one of the forward and reverse drive clutches of each of the electro-dynamic clutch means, and means operable by said cam for mechanically controlling the position of the throttle of each engine, and means between said steering wheel and said cam for effecting movement of said cam in response to rotary movement of said steering wheel.

3. In a control system for an industrial truck having an operator's steering wheel and a pair of driving wheels each provided with an engine, electro-dynamic clutch means having forward and reverse drive clutches, and a transmission, the combination of apparatus including a plurality of switches for effecting energization of said clutches, a cam movable by rotation of said steering wheel and adapted to effect actuation of said switches to engage the forward drive clutch of each electro-dynamic clutch means at a predetermined rotative position of said steering wheel, and means operable by said cam for controlling the position of the throttle of each engine so as to maintain said engines at the same speeds.

4. In a control system for an industrial truck having an operator's steering wheel and a pair of driving wheels each provided with an engine, electro-dynamic clutch means having forward and reverse drive clutches, and a transmission, the combination of apparatus including a plurality of switches for effecting energization of said clutches, a cam movable by rotation of said steering wheel and adapted to effect actuation of said switches to engage the reverse drive clutch of each electro-dynamic clutch means at a predetermined rotative position of said steering wheel, and means operable by said cam for controlling the position of the throttle of each engine so as to maintain said engines at the same speeds.

5. In a control system for an industrial truck having an operator's steering wheel and a pair of driving wheels each provided with an engine, electro-dynamic clutch means having forward and reverse drive clutches, and a transmission, the combination of apparatus including a plurality of switches for effecting energization of said clutches, a cam movable by rotation of said steering wheel and adapted to effect actuation of said switches to engage the forward drive clutch of one of the electro-dynamic clutch means at a predetermined rotative position of said steering wheel, and means operable by said cam for maintaining the throttle of the engine associated with the one forward drive clutch in a driving position and the throttle of the other engine in a reduced position.

6. In a control system for an industrial truck having an operator's steering wheel and a pair of driving wheels each provided with an engine, electro-dynamic clutch means having forward and reverse drive clutches, and a transmission, the combination of apparatus including a plurality of switches for effecting energization of said clutches, a cam movable by rotation of said steering wheel and adapted to effect actuation of said switches to engage the reverse drive clutch of one of the electro-dynamic clutch means at a predetermined rotative position of said steering wheel, and means operable by said cam for maintaining the throttle of the engine associated with the one reverse drive clutch in a driving position and the throttle of the other engine in an idling position.

7. In a control system for an industrial truck having an operator's steering wheel and a pair of driving wheels each provided with an engine, electro-dynamic clutch means having forward and reverse drive clutches, and a transmission, the combination of apparatus including a plurality of switches for effecting energization of said clutches, a cam movable by rotation of said steering wheel and adapted to effect actuation of said switches to engage the forward drive clutch of one of the electro-dynamic clutch means and the reverse drive clutch of the other electro-dynamic clutch means at a predetermined rotative position of said steering wheel, and means operable by said cam for controlling the position of the throttle of each engine so as to maintain the engines at the same speeds.

8. In a control system for an industrial truck having an operator's steering wheel and a pair of driving wheels each having associated therewith an engine, electro-dynamic clutch means having forward and reverse drive clutches, and a transmission, the combination of apparatus including a plurality of switches for effecting energization of said clutches, a cam having a serpentine groove formed therein, said cam being rectilinearly movable in response to rotary movement of the steering wheel thereby effecting actuation of said switches for controlling the electrical energization of none or one of the forward and reverse drive clutches of each of the electro-dynamic clutch means, a follower having association with said serpentine groove of said cam, and said follower having connection to a rocker member having plunger members associated therewith for controlling the positions of the throttle of each engine.

9. In a control system for an industrial truck having an operator's steering wheel and a pair of driving wheels each having associated therewith an engine, electro-dynamic clutch means having forward and reverse drive clutches, and a transmission, the combination of apparatus including a plurality of switches for effecting energization of said clutches, a cam movable by rotation of said steering wheel and adapted to effect actuation of certain of said switches to engage none or one of the forward and reverse drive clutches of each of the electro-dynamic clutch means, and a manually operable rod adapted at predetermined positions thereof to open and close certain of said switches to permit the selective movement of said truck in opposite directions.

10. In a control system for an industrial truck having an operator's steering wheel and a pair of driving wheels each having associated therewith an engine, electro-dynamic clutch means having forward and reverse drive clutches, and a transmission, the combination of apparatus including a plurality of switches for effecting energization of said clutches, a cam having a serpentine groove formed therein, said cam being rectilinearly movable in response to rotary movement of the steering wheel thereby effecting actuation of certain of said switches for controlling the electrical energization of none or one of the forward and reverse drive clutches of each of the electro-dynamic clutch means, a follower having association with said serpentine groove of said cam, said follower having connection to a rocker member having plunger members associated therewith for controlling the position of the throttle of each engine, and a manually operable rod adapted at predetermined positions thereof to open and close certain of said switches to permit the relative movement of said truck in opposite directions.

GEORGE L. TURNER.
ROBERT LAPSLEY.

References Cited in the file of this patent

UNITED STATES PATENTS

| Number | Name | Date |
|---|---|---|
| 178,014 | Lull | May 30, 1876 |
| 757,261 | Brown | Apr. 12, 1904 |
| 957,474 | Parkes | May 10, 1910 |
| 972,455 | Kendrick | Oct. 11, 1910 |
| 1,136,279 | Severy | Apr. 20, 1915 |
| 1,254,057 | Moore | Jan. 22, 1918 |
| 1,405,391 | Blanc-Garin | Feb. 7, 1922 |
| 1,453,056 | Risser et al. | Apr. 24, 1923 |
| 1,805,141 | Harkness | May 12, 1931 |
| 1,842,217 | Tracy et al. | Jan. 19, 1932 |
| 2,004,928 | Centervall | June 18, 1935 |
| 2,126,255 | Hacker | Aug. 9, 1938 |
| 2,275,142 | Hale | Mar. 3, 1942 |
| 2,302,570 | Peterson | Nov. 17, 1942 |
| 2,309,875 | Thompson | Feb. 2, 1943 |
| 2,375,167 | Frudden | May 1, 1945 |
| 2,503,928 | Von Voorhis et al. | Apr. 11, 1950 |
| 2,530,574 | Getman | Nov. 21, 1950 |
| 2,536,737 | Gerst | Jan. 2, 1951 |
| 2,548,756 | Winther | Apr. 10, 1951 |